United States Patent [19]

Hartness et al.

[11] 4,060,166
[45] Nov. 29, 1977

[54] CONTAINER SEPARATOR

[76] Inventors: Thomas P. Hartness, 305 Bridgewater Drive; Robert G. Hartness, 203 Wilmington Road, both of Greenville, S.C. 29607

[21] Appl. No.: 739,126

[22] Filed: Nov. 5, 1976

[51] Int. Cl.² .............................................. B65G 27/10
[52] U.S. Cl. ...................................... 198/446; 198/631
[58] Field of Search ............... 198/443, 445, 446, 458, 198/631, 442; 193/35 SS

[56] References Cited

U.S. PATENT DOCUMENTS

| 2,393,334 | 1/1946 | Mobley et al. | 198/446 |
| 2,586,586 | 2/1952 | Washburn et al. | 198/446 X |
| 2,917,169 | 12/1959 | Kingston et al. | 198/445 X |
| 3,552,537 | 1/1971 | Vamvakas | 198/442 |
| 3,710,918 | 1/1973 | Babunovic 198 | 445/ |
| 3,854,568 | 12/1974 | Willsey | 198/446 |

FOREIGN PATENT DOCUMENTS 210,231   9/1957   Australia .............................. 198/446

*Primary Examiner*—John J. Love
*Assistant Examiner*—James L. Rowland
*Attorney, Agent, or Firm*—Bailey, Dority & Flint

[57] ABSTRACT

A device for aiding in separating a comingled mass of containers being transported on a pair of conveyor belts. The device includes a cam means which is reciprocally moved up and down for raising and lowering the inner edge of the conveyor belts from a horizontal to a tilted position. This vibrates the containers preventing them from becoming wedged against vertical divider plates which are used for separating the containers into rows.

3 Claims, 3 Drawing Figures

CONTAINER SEPARATOR

BACKGROUND OF THE INVENTION

The present invention relates to a device for separating a comingled mass of containers being transported on conveyor belts into rows of containers.

Devices for separating comingled masses of containers being moved on conveyors into individual rows of containers are well known. An example of such a device is disclosed in U.S. Pat. No. 3,552,537 wherein a center rail is used for directing the containers onto one conveyor belt or the other. In U.S. Pat. Nos. 3,643,792 and 3,710,918 wedge shaped elements are used for separating the containers into individual rows.

Heretofore, divider plates were utilized for separating the containers into rows. One problem encountered in using divider plates was that a container would often become wedged against the end of the divider plate stopping the flow of bottles into one or more of the rows.

In one attempt to prevent this from happening, the containers were reciprocally shifted laterally. However, this often caused damage to the containers and to the labels as a result of the containers rubbing against each other.

In another attempt to prevent the containers from becoming jammed against the end of the vertically extending dividers, a vibrator was connected to the side of the conveyor.

SUMMARY OF THE INVENTION

The invention includes a device which aids in separating a comingled mass of containers being moved on a pair of driven conveyor belts into rows. The conveyor belts are continuous with the inner edges thereof being positioned closely adjacent to each other so that containers do not fall therebetween. Means is carried below the conveyor belts for reciprocally moving the inner edges of the conveyor belts above the normal horizontal run of the conveyors causing said conveyors to be alternately shifted between a horizontal position and a position wherein the conveyors slope downwardly from the inner edges towards the outer edges. This causes the containers to be raised up and down and vibrated so as to prevent them from becoming jammed against vertically extending divider plates. The vertically extending divider plates are carried above the conveyor belts after the means for reciprocally moving the inner edges of the conveyor belt. The divider plates maintain the containers in rows as they are moved on the conveyors.

The means for reciprocally moving the inner edges of the conveyor belts and vibrating the containers includes a cam which is rotated for raising and lowering a pivotal elongated member that abuts against the lower surface of the inner edges of the conveyor belts for accordingly raising and lowering the inner edges of the conveyor belts.

Accordingly, it is an important object of the present invention to provide a device for aiding in separating a comingled mass of containers into rows as they are moved along on a pair of conveyor belts.

Another important object of the invention is to provide a device for vibrating containers being moved on a conveyor belt so as to prevent the containers from becoming jammed against the ends of vertically extending divider plates.

Still another important object of the present invention is to provide a means for alternately raising and lowering the inner edges of a pair of conveyor belts for laterally shifting containers being transported thereon into rows.

Still another important object of the present invention is to provide a simple and relatively inexpensive device for separating containers being moved on conveyor belts into individual rows.

These and other objects and advantages of the invention will become apparent upon reference to the following specification, attendant claims, and drawing.

DESCRIPTION OF A PREFERRED EMBODIMENT

Figure 1:
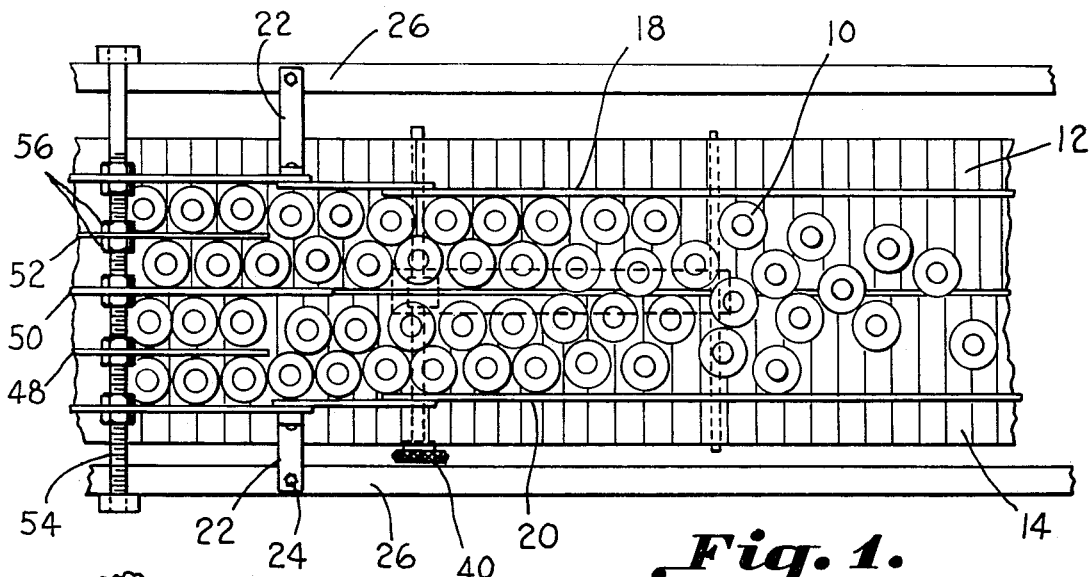
FIG. 1 is a plan view illustrating a comingled mass of containers being transported on a pair of conveyor belts and being separated into individual rows by a device constructed in accordance with the present invention.
Figure 2:
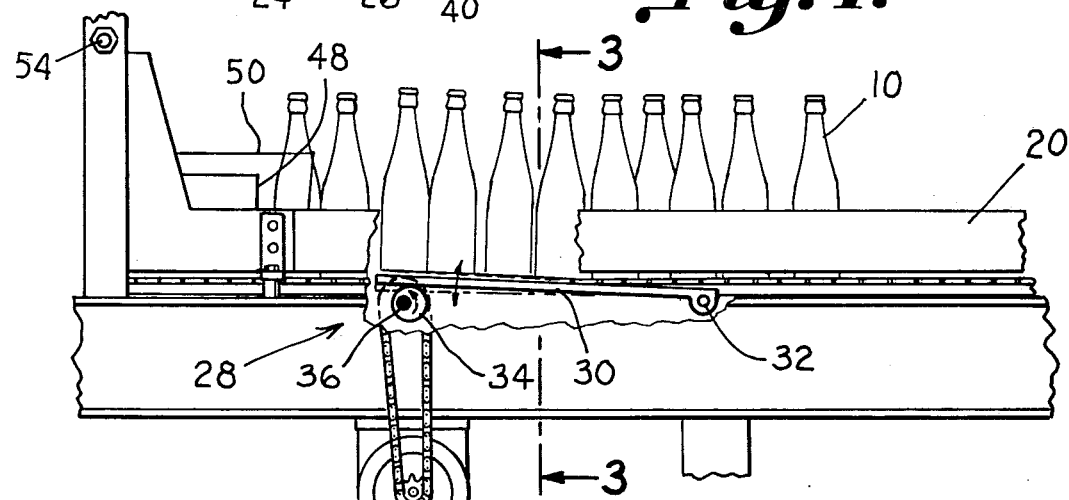
FIG. 2 is a side elevational view of the device illustrated in FIG. 1.

Referring in more detail to the drawing, there is illustrated a portion of a conventional conveyor system wherein containers such as bottles 10 are being transported on a pair of conveyor belts 12 and 14 to a case packing device, not shown, such as illustrated in U.S. Pat. No. 3,788,034. Prior to the containers entering the case packer, the bottles 10 must be separated into rows so as to be dropped into the proper compartments of the cases. Since the loading of the bottles into the cases takes place at a rapid pace, it is important that the containers be aligned in rows as they are moved along on the conveyor belts 12 and 14. Conveyor belts 12 and 14 are driven by any suitable conventional conveyor drive mechanism and are normally supported along their run on elongated rails 16a through 16d. These rails are suitably supported by any conventional means, not illustrated.

As the bottles are moved along on the conveyors 12 and 14, they are laterally restrained by vertically extending side plates 18 and 20 which are suitably mounted on a bracket 22. The bracket 22 is, in turn, bolted by means of a bolt 24 to a rail 26 forming part of the overall conveyor system. As illustrated in the drawing, the vertically extending side rails 18 and 20 are spaced slightly less than four bottles wide when loading a four-bottle wide case. As a result of the side rails 18 and 20 being spaced slightly less than the width of four bottles, the bottles are transported in a staggered manner as illustrated in FIG. 1.

Figure 3:
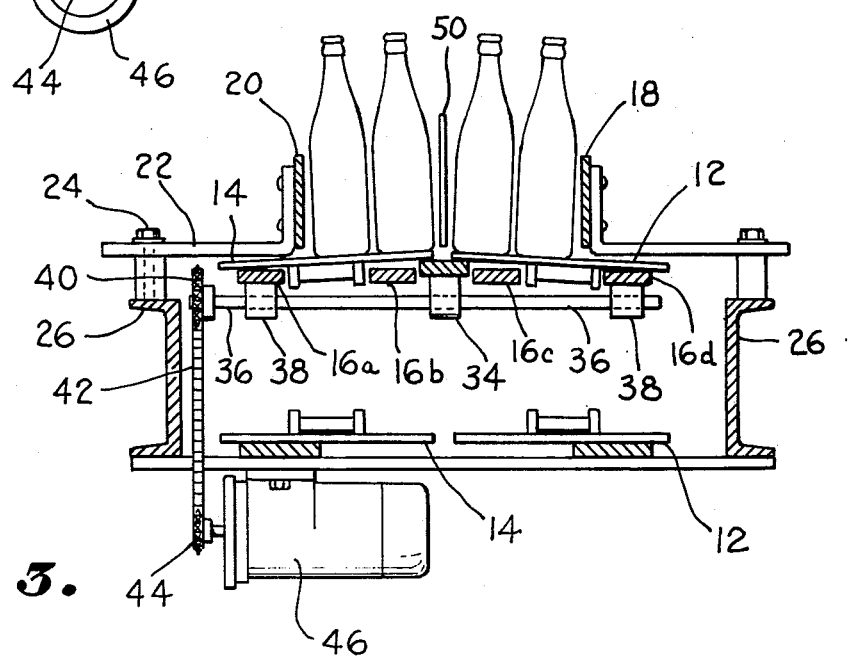
FIG. 3 is a sectional view taken along line 3—3 of FIG. 2.

A cam means generally designated by the reference character 28 is provided for alternately raising and lowering the inner edges of the conveyor belts 12 and 14 so that the belts slope downwardly from the inner edges towards the outer edges as illustrated in FIG. 3. The cam means includes an elongated arm 30 which is pivotally secured below the conveyor belts on a rod extending through the opening 32 provided in one end thereof. The other end of the arm 30 rests on the surface of eccentric cam 34 carried on a shaft 36 which is journaled in bearing blocks 38 provided beneath the conveyor belts. A sprocket 40 is carried on the outer end of the shaft 36 and has a chain 42 meshed therewith. The other end of the chain 42 passes around a gear 44 carried on the end of a shaft extending out of motor 46. This motor 46 is, in turn, suitably mounted on the frame of the conveyor system. As the motor rotates the shaft 36 through the chain 42, the cam 34 causes the pivotal arm 30 to be alternately raised and lowered. Since the pivotal arm 30 presses against the bottom of the inner edges of the belts 12 and 14 it, in turn, alternately causes the belts to be shifted from a horizontal normal running position to a sloping position such as illustrated in FIG. 3. This causes the bottles to be alternately raised and lowered or vibrated.

Conventional vertical extending divider plates 48, 50 and 52 define rows through which the bottles then pass. The divider plates 48, 50 and 52 are supported on a shaft 54 carried above the conveyor belts. It is noted that the shaft 54 is threaded and has nuts 56 provided thereon so that the position of the divider plates 48, 50 and 52 can be varied.

After the bottles are fed through the divider plates 48, 50 and 52 in rows, they are then generally fed to a case packer such as disclosed in U.S. Pat. No. 3,788,034.

In operation, as the bottles 10 are moved on the conveyor belts 12 and 14 the conveyor belt passes over the cam means 28. The rotating cam 30 causes the pivotal arm to be alternately raised and lowered, which in turn, raises and lowers a portion of the conveyor belts 12 and 14. This, in turn, causes the bottles passing over the camming surface to be vibrated by being alternately raised and lowered. As the bottles approach the divider plates 48, 50 and 52 the vibration thereto ensures that they are fed into one row or the other and not permitted to jam against the end of the divider plates 48, 50 and 52.

In one particular embodiment the belts are raised and lowered at a rate of approximately one hundred times per minute. However, this rate varies according to the speed that the conveyor belts are running.

While there are two conveyor belts illustrated in the drawings, it is to be understood that a cam means could be utilized for raising a single conveyor belt upon which bottles are being transported for vibrating the bottles in order to prevent them from becoming jammed against the divider plates. Furthermore, instead of using an eccentric for raising and lowering a pivotal arm, it is possible to use an enlarged eccentric for bearing directly against the bottom of the conveyor belts 12 and 14 for raising and lowering the conveyor belts.

While a preferred embodiment of the invention has been described using specific terms, such description is for illustrative purposes only, and it is to be understood that changes and variations may be made without departing from the spirit or scope of the following claims.

What is claimed is:

1. A device for aiding in separating a comingled mass of containers being moved on at least a pair of driven conveyor belts into rows, said conveyor belts being positioned adjacent each other with the inner edges thereof running parallel to each other, vertically extending divider plates are carried above the conveyor belts for separating and maintaining the containers in rows as they are moved on the conveyor belts, said device comprising:
   a. an eccentrically mounted cam carried below said conveyor belts in engagement with the inner edges of said belts directly ahead of said divider plates, and
   b. means for alternately raising and lowering said cam means causing said inner edges of said conveyor belts directly ahead of said divider plates to be reciprocally raised and lowered, said containers being moved on said belts being raised and lowered with said belts, whereby the movement of said containers caused by being raised and lowered prevents said containers from becoming jammed against the ends of said divider plates as they are separated into rows.

2. The device as set forth in claim 1 further comprising:
   a. an elongated member positioned between said cam and the bottom side of said conveyor belts;
   b. means for pivotally supporting one end of said elongated member so that as said cam is rotated, the other end of said elongated member is alternately raised and lowered for alternately raising and lowering said inner edges of said conveyor belts.

3. A device for aiding in separating a comingled mass of containers being moved on a pair of driven conveyor belts into rows, said conveyor belts being positioned adjacent each other with the inner edges thereof running parallel to each other, said device comprising:
   a. cam means carried below said conveyor belts in engagement with the inner edges of said belts;
   b. means for alternately raising and lowering said cam means causing said inner edges of said conveyor belts to be alternately shifted between a horizontal position and a position wherein said conveyors slope downwardly from their inner edges towards said outer edges; and
   c. vertically extending divider plates carried above said conveyors after said cam means for separating said containers into rows;

whereby the raising and lowering of said conveyor belts prevents said containers from becoming jammed against the ends of said divider plates as they are separated into rows.

* * * * *